United States Patent
Yamauchi et al.

(10) Patent No.: US 7,782,633 B2
(45) Date of Patent: Aug. 24, 2010

(54) NON-CONTACT POWER TRANSMISSION DEVICE

(75) Inventors: Yukinaga Yamauchi, Ono (JP); Hidekazu Hirase, Ono (JP)

(73) Assignee: Hokushin Denki Co., Ltd., Ono-shi, Fukui (JP)

( * ) Notice: Subject to any disclaimer, the term of this patent is extended or adjusted under 35 U.S.C. 154(b) by 494 days.

(21) Appl. No.: 11/660,972

(22) PCT Filed: Aug. 26, 2005

(86) PCT No.: PCT/JP2005/015506

§ 371 (c)(1),
(2), (4) Date: Feb. 23, 2007

(87) PCT Pub. No.: WO2006/022365

PCT Pub. Date: Mar. 2, 2006

(65) Prior Publication Data

US 2007/0252441 A1    Nov. 1, 2007

(30) Foreign Application Priority Data

Aug. 27, 2004 (JP) .............................. 2004-248139
Aug. 31, 2004 (JP) .............................. 2004-251769

(51) Int. Cl.
H02M 3/335    (2006.01)
(52) U.S. Cl. .................................................. 363/21.02
(58) Field of Classification Search .............. 363/21.01, 363/21.02
See application file for complete search history.

(56) References Cited

U.S. PATENT DOCUMENTS 6,252,386 B1 * 6/2001 Minami et al. .............. 323/355
6,396,717 B2 * 5/2002 Yasumura ................. 363/21.02
6,430,064 B1 * 8/2002 Tsuchimoto et al. .......... 363/24
6,504,732 B2 * 1/2003 Abe ............................. 363/17
6,963,263 B1 * 11/2005 Cook et al. .................. 336/178
7,298,633 B2 * 11/2007 Yasumura ................. 363/21.02
7,310,245 B2 * 12/2007 Ohbo ....................... 363/21.02
7,310,249 B2 * 12/2007 Yasumura .................... 363/24
2003/0095419 A1 * 5/2003 Yasumura ................. 363/21.02
2003/0198062 A1 * 10/2003 Yasumura .................... 363/16

(Continued)

FOREIGN PATENT DOCUMENTS

JP    S55-008284    1/1980

(Continued)

*Primary Examiner*—Adolf Berhane
*Assistant Examiner*—Yemane Mehari
(74) *Attorney, Agent, or Firm*—Manabu Kanesaka (57) ABSTRACT

A non-contact power transmission device, which is capable of efficiently reducing the device size and reducing unnecessary radiation of a harmonic component from a primary side coil, is provided. The non-contact power transmission device which includes a primary side unit and a secondary side unit which house a primary side and a secondary side of a coupling transformer individually and can be separated from each other, a capacitor $C_1$ which resonates with a primary side coil $L_1$ is connected to the primary side coil $L_1$ in series so that a primary side series resonance circuit is formed, an L-shaped resonance circuit which has a coil $L_3$ and a capacitor $C_7$ resonating with the coil $L_3$ is inserted between the primary side series resonance circuit and a driving circuit, and the L-shaped resonance circuit is connected to the primary side series resonance circuit in series.

9 Claims, 6 Drawing Sheets

U.S. PATENT DOCUMENTS

| | | |
|---|---|---|
| 2003/0214821 A1* | 11/2003 | Giannopoulos et al. .. 363/21.02 |
| 2004/0012985 A1* | 1/2004 | Ribarich .................. 363/21.02 |
| 2005/0018452 A1* | 1/2005 | Seo ............................ 363/16 |

FOREIGN PATENT DOCUMENTS

| | | |
|---|---|---|
| JP | H10-023689 | 1/1998 |
| JP | H11-224822 | 8/1999 |
| JP | 2000-116154 | 4/2000 |
| JP | 2000-269058 | 9/2000 |
| JP | 2002-199598 | 7/2002 |
| JP | 2002-354712 A | 12/2002 |
| JP | 2004-159456 A | 6/2004 |

* cited by examiner

NON-CONTACT POWER TRANSMISSION DEVICE

TECHNICAL FIELD

The present invention relates to a non-contact power transmission device, and in particular, to a con-contact power transmission device which can improve power transmission efficiency, can realize downsizing and high efficiency and can reduce harmonic components unnecessarily radiated from a primary side coil.

BACKGROUND ART

In a conventional non-contact power transmission device which includes a primary side unit and a secondary side unit of a coupling transformer which house a primary side and a secondary side individually and can be separated from each other, it is required that power transmission efficiency is improved without upsizing the device.

In order to achieve the above object, conventionally a coupling coefficient of a non-contact transformer is solely increased (for example, see Patent Documents 1 and 2).

Patent Document 1: Japanese Patent Application Laid-Open No. 2002-199598

Patent Document 2: Japanese Patent Application Laid-Open No. 2000-269058

However, when a gap between a primary core and a secondary core of the coupling transformer is close to 10 mm, it is not easy to increase the coupling coefficient. This is the first disincentive at the time of realizing high-output power non-contact power transmission devices.

Further, when a parallel resonance circuit which is conventionally used as a secondary side resonance circuit of the coupling transformer in the non-contact power transmission device is used, as load impedance is lower, the power which can be supplied to the load becomes less. This is the second disincentive to realizing high-output power of the non-contact power transmission devices in the lower impedance load.

This will be explained with reference to FIG. 6.

Figure 6:
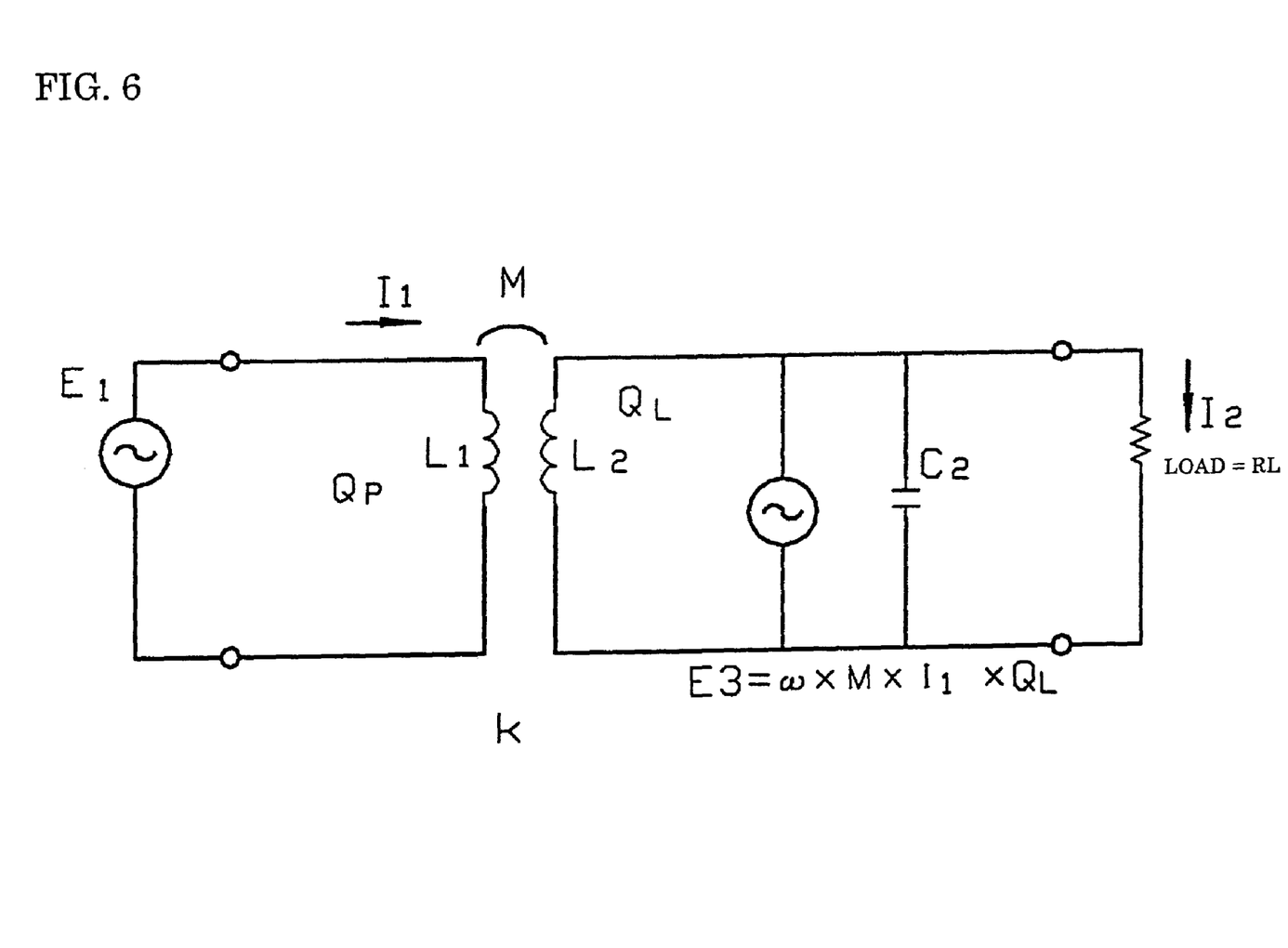
FIG. 6 is a circuit (equivalent circuit) diagram explaining a second problem in a conventional non-contact power transmission device.

In an equivalent circuit where a secondary side parallel resonance circuit and a load are connected as shown in FIG. 6, an electric current $I_2$ flowing in a load $R_L$ connected to the resonance circuit in parallel is expressed by the following formula when an angular frequency is designated by $\omega$, a load of the secondary side circuit is designated by $Q_L$, a coil current of the primary side circuit is designated by $I_1$, a mutual inductance of the coupling transformer is designated by M and an inductance of the secondary side coil is designated by $L_2$.

[Mathematical Formula 1]

$$I_2 = (\omega \times M \times I_1 \times Q_L)/R_L \qquad \text{(Formula 1)}$$

Here,

[Mathematical Formula 2]

$$Q_L = R_L/(\omega \times L_2) \qquad \text{(Formula 2)}$$

For this reason, $Q_L$ of the mathematical formula 2 is assigned to the mathematical formula (1), and the following formula is obtained:

[Mathematical Formula 3]

$$I_2 = (M \times I_2)/L_2 \qquad \text{(Formula 3)}$$

According to the (formula 3), when the primary current $I_1$ is constant, the load current $I_2$ becomes constant regardless of the load $R_L$. The secondary side is expressed equivalently by a constant-current power supply. For this reason, even if the load is reduced, the electric power which can be supplied to the load reduces because the load current is constant.

Further, when the primary side of the coupling transformer is driven by a rectangular wave, a harmonic component is unnecessarily emitted from the primary side coil $L_1$ of the coupling transformer to a space, thereby possibly interfering peripheral electronic devices.

In the non-contact power feeding device, therefore, a circuit in which a low-pass filter is connected to a front side of the primary side feeder cable is proposed in order to reduce a harmonic current of a primary side feeder cable (primary side coil) (for example, see Patent Document 3).

Patent Document 3: Japanese Patent Application Laid-Open No. 11-224822

DISCLOSURE OF THE INVENTION

Problem to be Solved by the Invention

In the circuit disclosed in this document, a primary side feeder cable is connected in series to a subsequent tier of the low-pass filter composed of a coil and a capacitor. The technique disclosed in this document can reduce the unnecessary radiation on the primary side feeder cable to a certain extent, but the size of an entire resonance circuit Q is not sufficient, and thus distortion is still large in the primary side coil.

The present invention has been devised in view of the above problem, and its object is to provide a non-contact power transmission device which is small and highly efficient and is capable of reducing a harmonic component unnecessarily radiated from a primary side coil.

Means for Solving the Problem

The inventor of the present invention has paid attention to mutual inductances on the primary and secondary sides in order to enable the efficient transmission of an electric power without increasing the device.

When a coupling coefficient is designated by k, the inductance of the primary side coil is designated by $L_1$ and the inductance of the secondary side coil is designated by $L_2$, the mutual inductance M of the coupling transformer is expressed by the following formula:

$$M = k\sqrt{(L_1 \times L_2)} \qquad \text{(Formula 4)}$$

The formula 4 shows that the mutual inductance M can be increased by increasing the inductance $L_1$ of the primary side coil and the inductance $L_2$ of the secondary side coil, thereby producing the effect similar to that obtained by heightening the coupling coefficient, and thus the power transmission efficiency can be heightened.

Further, the inventor of the present invention has paid attention to the point that the power transmission efficiency can be heightened by providing a series resonance circuit to the primary side or both the primary and secondary sides because $I_2 = (\omega \times M \times I_1)/R_L$ in the series resonance circuit.

Further, the inventor of the present invention has found out that when a resonance circuit composed by connecting a coil and a capacitor into an L shape is inserted in series between the series resonance circuit and a driving circuit on the primary side, rectangular wave driving from a high-frequency inverter can be converted into a sinusoidal voltage waveform with less distortion on the primary side coil, thereby reducing the unnecessary radiation of the harmonic component to space.

Specifically, from a first aspect, a non-contact power transmission device of the present invention, which has a primary side unit and a secondary side unit housing a primary side and a secondary side of a coupling transformer individually and capable of being separated from each other, is constituted so that a capacitor which resonates with a primary side coil is connected to the primary side coil in series so that a primary side series resonance circuit is formed, an L-shaped resonance circuit having a coil and a capacitor resonating with the coil is inserted between the primary side series resonance circuit and a driving circuit, and the L-shaped resonance circuit is connected to the primary side series resonance circuit in series.

In this case, from a second aspect, on not only the primary side but also on the secondary side, a capacitor which resonates with a secondary side coil is connected to the secondary side coil so that a secondary side series resonance circuit may be formed.

In the non-contact power transmission device of the present invention, a circuit including a high-frequency inverter can be used as the drive circuit, and the circuit may be any one of a half-bride type one and a full-bridge type one.

From a third aspect, the L-shaped resonance circuit may compose a filter such as a low-pass filter. From a fourth aspect, in this case, a resonance frequency of the L-shaped resonance circuit is made to be lower than a driving frequency of the driving circuit by 5% to 25%.

From a fifth-aspect, a resonance frequency of the primary side series resonance circuit may be the same as the driving frequency of the driving circuit. Similarly, from a sixth aspect, also a resonance frequency of the secondary side series resonance circuit may be the driving frequency of the high-frequency inverter.

From a seventh aspect, in the non-contact power transmission device of the present invention, the other capacitors may be connected to the primary side coil in parallel in the primary side series resonance circuit.

As a result, a secondary side output voltage can be adjusted by setting the values of the capacitor composing the primary side series resonance circuit and the other capacitors.

From an eighth aspect, the L-shaped resonance circuit can compose an impedance matching circuit. The impedances of the primary side series resonance circuit viewed from the L-shaped resonance circuit and the L-shaped resonance circuit viewed from the side of the primary side series resonance circuit are matched with each other by using the L-shaped resonance circuit so that they become equal to each other.

Effects of the Invention

According to the present invention, the series resonance circuit is provided to the primary side or both the primary and secondary sides, thereby improving the transmission efficiency and reducing the device size.

Further, when the primary side series resonance circuit including the primary side coil is connected to the L-shaped resonance circuit in series, the rectangular wave driving voltage from the high-frequency inverter can be converted into the sinusoidal voltage waveform with less distortion on the primary side coil, thereby reducing the unnecessary radiation of the harmonic component from the primary side coil to space.

The non-contact power transmission device of the present invention is effective in high power transmission.

DESCRIPTION OF REFERENCE NUMERALS $L_1$: primary side coil
$L_2$: secondary side coil
$C_1$: capacitor for primary side series resonance
$C_2$: capacitor for secondary side series resonance
$L_3$: coil of L-shaped resonance circuit
$C_7$: capacitor of L-shaped resonance circuit Best Mode for Carrying Out the Invention A preferable embodiment of the present invention will be explained in detail below with reference to the drawings. First, a constitution of a coupling transformer in this embodiment will be explained with reference to FIG. 3.

Figure 3:
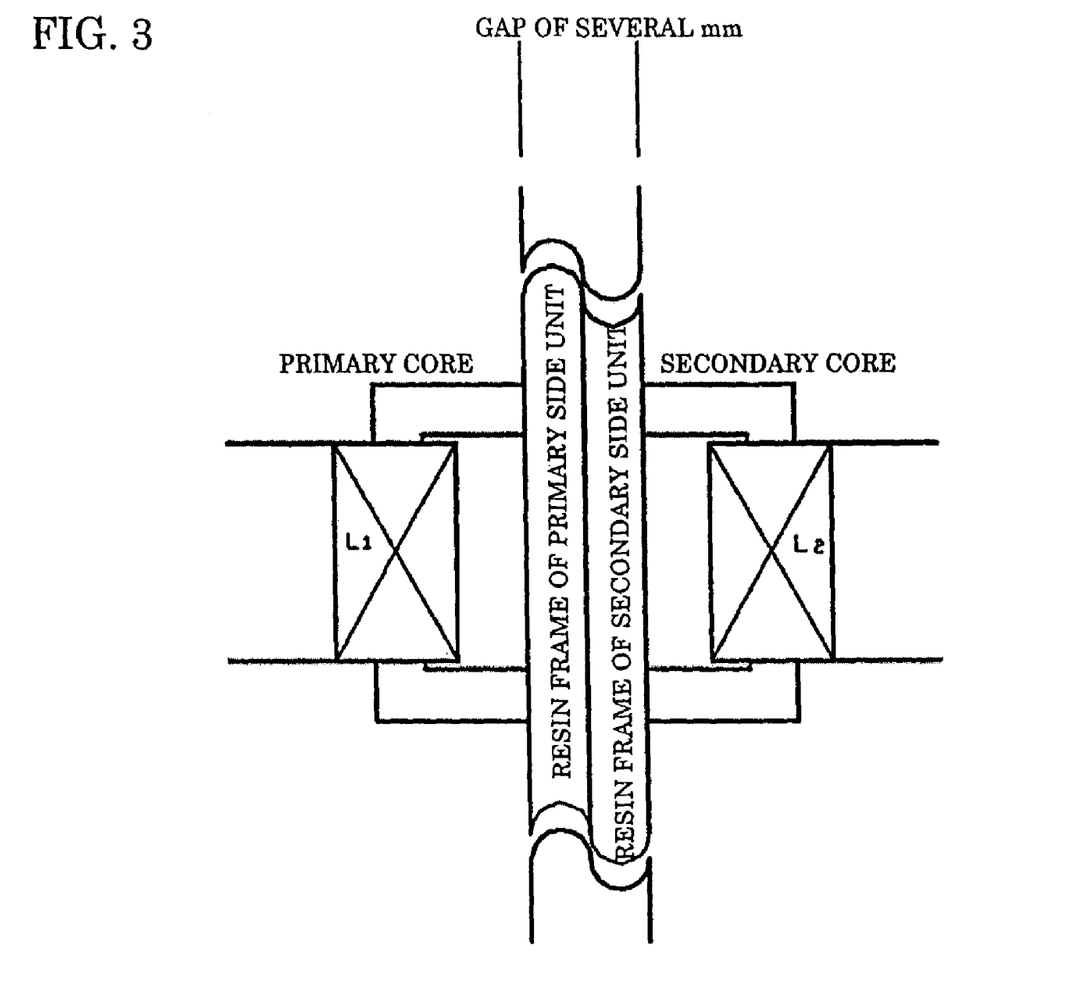
FIG. 3 is a schematic diagram explaining a constitution of a coupling transformer according to the embodiment.

As shown in FIG. 3, a primary winding wire is wound around a body portion of a U-shaped primary core provided to a primary side unit (unit on the left side on the paper) so that a primary side coil $L_1$ is formed. Further, a winding wire is wound around a body portion of a U-shaped secondary core provided to a secondary side unit (unit on the right side) so that a secondary side coil $L_2$ is formed. A high-frequency power is taken out from a magnetic line of the primary side coil $L_1$ by using the secondary side coil $L_2$.

A resin frame of the primary side unit and a resin frame of the secondary side unit are provided between the primary side unit and the secondary side unit of the coupling transformer. A front end of a leg portion of the U-shaped core of the primary side unit and a front end of a leg portion of the U-shaped core of the secondary side unit in the coupling transformer are opposed to each other with a gap of several millimeters being left therebetween by the resin frames.

A circuit configuration of the non-contact power transmission device of the present invention will be explained below with reference to FIGS. 1 and 2.

Figure 1:
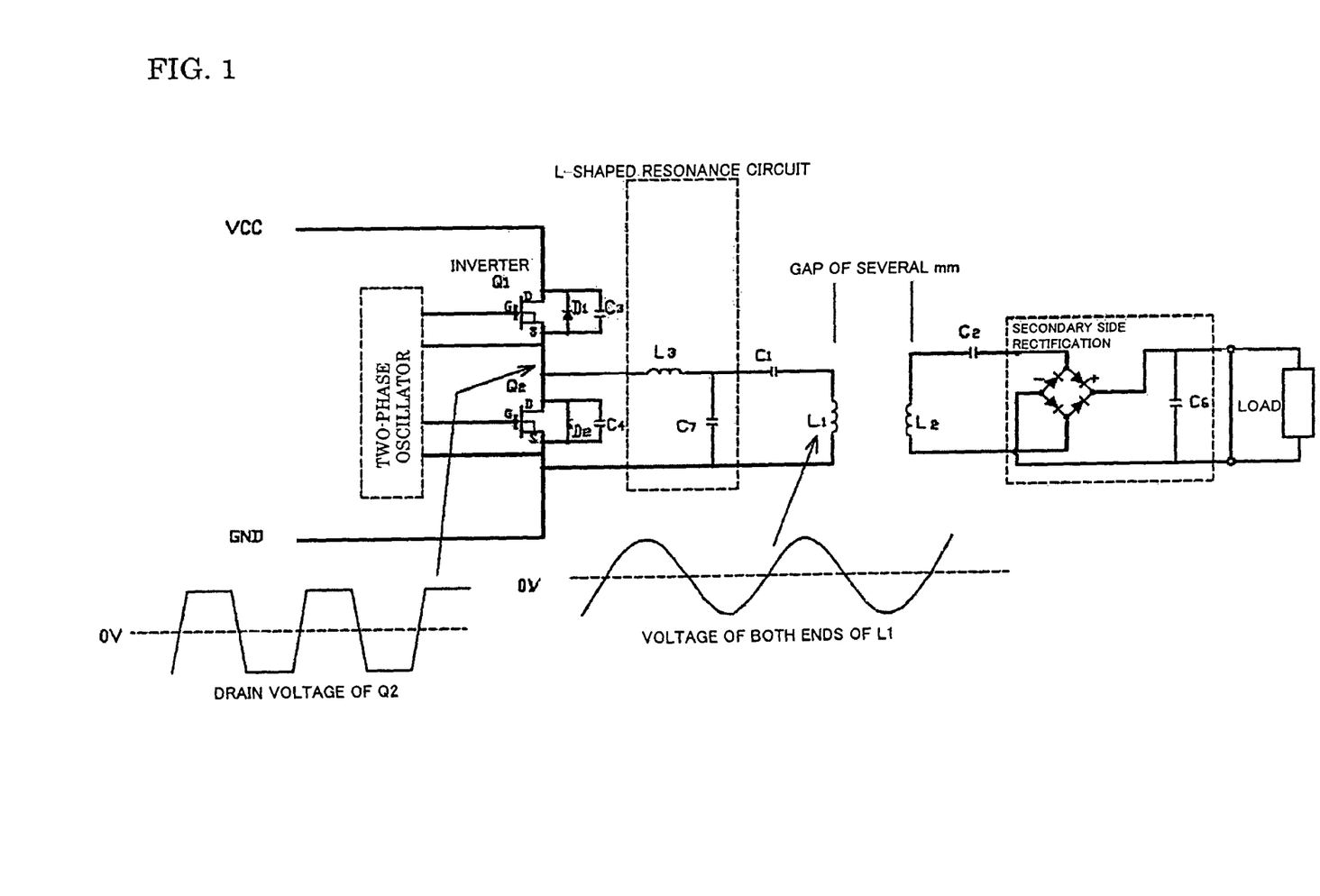
FIG. 1 is a diagram explaining a circuit configuration of a non-contact power transmission device according to one embodiment of the present invention.

As shown in FIG. 1, the primary side coil $L_1$ is connected to a capacitor $C_1$ in series so that a primary side series resonance circuit is formed. Further, the secondary side coil $L_2$ is connected to a capacitor $C_2$ in series so that a secondary side series resonance circuit is formed.

The setting is determined so that a resonance frequency of the capacitor $C_1$ connected to the primary side coil $L_1$ of the coupling transformer in series becomes the same as a driving frequency of an inverter and a resonance frequency of the capacitor $C_2$ connected to the secondary side coil $L_2$ of the coupling transformer in series becomes the same as a driving frequency of an inverter.

In the inverter of the primary side unit 1, as shown in FIG. 1, a DC output from a primary side rectification circuit is used as a power supply. The inverter is half-bridge connected and is driven by a two-phase oscillator. The two-phase oscillator is an oscillator of a fixed frequency which alternately drives a field-effect transistor $Q_1$ and a field-effect transistor $Q_2$ composing the inverter with a voltage in such a manner that dead time is provided between a gate and a source (G and S) of the field-effect transistor $Q_1$ and between G and S of the field-effect transistor $Q_2$.

In the inverter, a drain D of the field-effect transistor $Q_1$ is connected to a VCC side of the primary side rectification circuit, the source S of the field-effect transistor $Q_1$ is connected to a drain D of the field-effect transistor $Q_2$ in series, and the source S of the field-effect transistor $Q_2$ is connected to a GND side of the primary side rectification circuit.

In this embodiment, the inverter, the primary side rectification circuit and the two-phase oscillator compose the driving circuit.

The series resonance circuit is provided to the primary and secondary sides, so that the electric power can be supplied to the secondary side with high efficiency. However, the problem of the unnecessary radiation of a harmonic component is not still solved only by the series resonance circuit.

Figure 5:
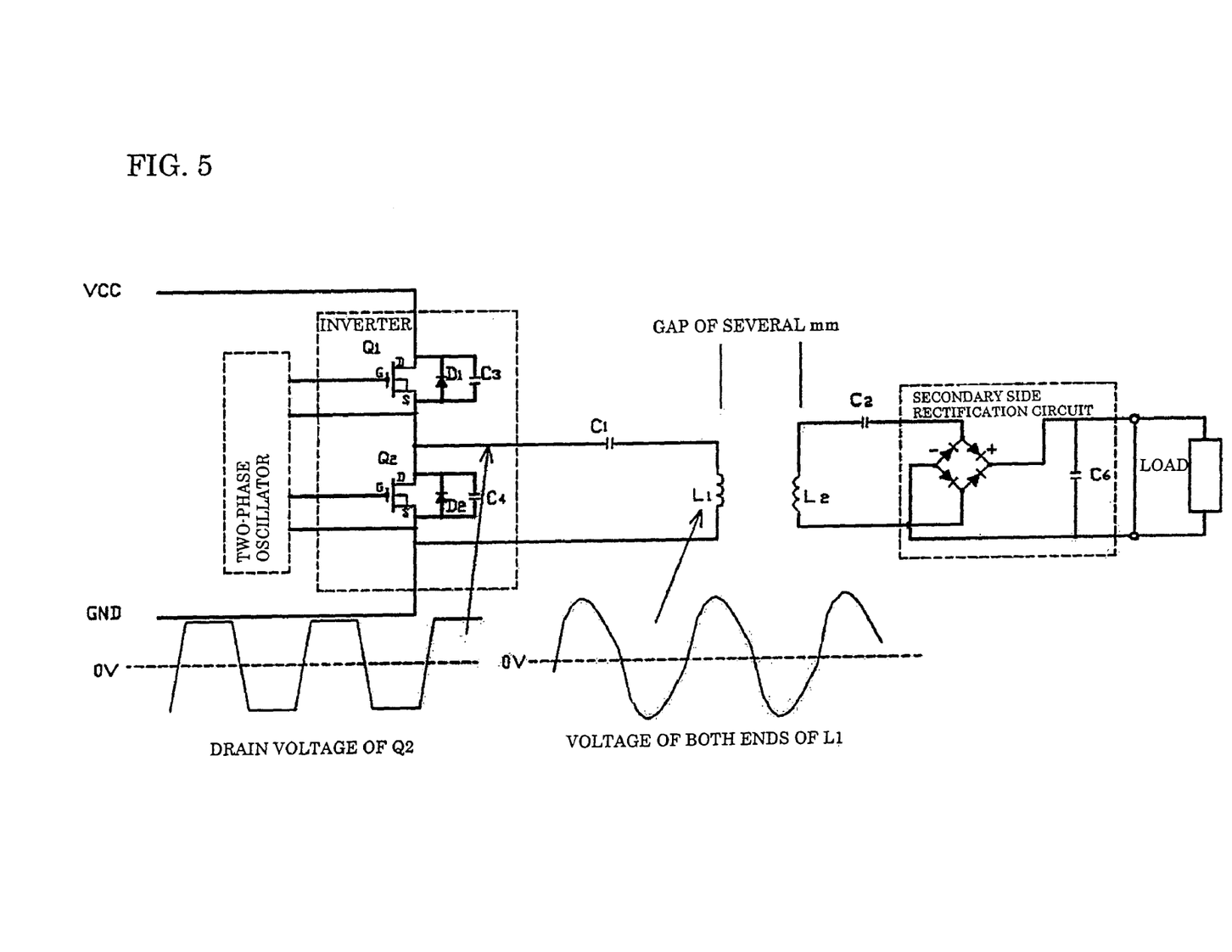
FIG. 5 is a circuit diagram explaining a remaining problem in the case where a series resonance circuit is provided to the primary and secondary sides.

That is to say, as shown in FIG. 5, when the capacitor is connected to the primary side coil in series so that the series resonance circuit is formed, a driving voltage to be applied to the primary side coil is a sine wave having much distortion, and thus the harmonic component of the driving voltage on the primary side coil is unnecessarily radiated to space.

In this embodiment, therefore, as shown in FIG. 1, a coil $L_3$ is connected to a connecting point between the source S of the field-effect transistor $Q_1$ and the drain D of the field-effect transistor $Q_2$, and a capacitor $C_7$ which resonates with the coil $L_3$ is connected in series into an inverted L shape as shown in the drawing so that the resonance circuit (in this specification, "L-shaped resonance circuit") is formed.

The capacitor $C_1$ is connected to a connecting point between the coil $L_3$ and the capacitor $C_7$ of the L-shaped resonance circuit, and the other end of the capacitor $C_1$ is connected to the primary side coil $L_1$. Further, the other end of the primary side coil $L_1$ is connected to the source S of the field-effect transistor $Q_2$. A capacitor $C_3$ is connected to the drain D and the source S of the field-effect transistor $Q_1$ in parallel, and a capacitor $C_4$ is connected to the drain D and the source S of the field-effect transistor $Q_2$ in parallel.

Reference symbols $D_1$ and $D_2$ designate body diodes of the field-effect transistors $Q_1$ and $Q_2$.

The coil $L_3$ of the L-shaped resonance circuit is installed so as to determine an electric current to be applied to the primary side coil $L_1$ of the coupling transformer at the driving frequency of the inverter. That is to say, the inductance of the coil $L_3$ is determined so that the electric current to be applied to the primary side coil $L_1$ obtains a desired value, and thereafter, the value of the capacitor $C_7$ is determined so that the resonance frequency of the coil $L_3$ and the capacitor $C_7$ becomes lower than the driving frequency by 5% to 25%, and preferably, by 10% to 20%.

In such a manner, the non-contact power transmission device of the present invention is constituted so that the L-shaped resonance circuit whose resonance frequency is set to be lower than the driving frequency of the inverter by about 10% to 20% is connected to the primary side series resonance circuit whose resonance frequency is adjusted to the driving frequency of the inverter composed of the primary side coil $L_1$ and the capacitor $C_1$ of the coupling transformer in two-tiered series.

The L-shaped resonance circuit in this embodiment also has a function as a filter (low-pass filter), and thus can reduce the unnecessary radiation of the harmonic component from the primary side coil $L_1$.

Further, impedances are matched with each other by using the L-shaped resonance circuit so that the impedance of the primary side coil $L_1$ viewed from the L-shaped resonance circuit and the capacitor $C_1$ connected to the primary side coil $L_1$ in series becomes equal to the impedance of the primary side coil $L_1$ and the L-shaped resonance circuit viewed from the capacitor $C_1$.

Figure 2:
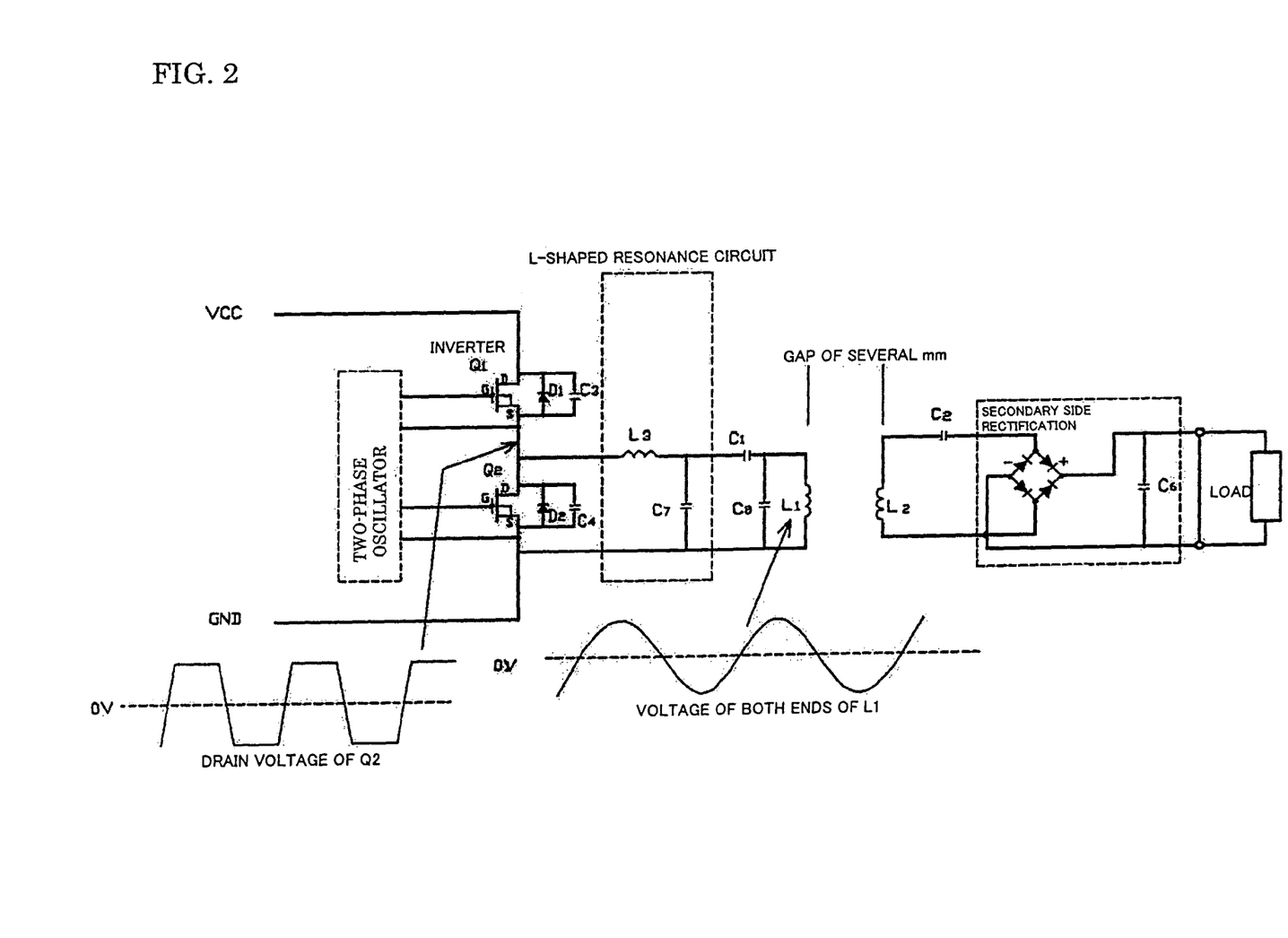
FIG. 2 is a diagram explaining a circuit configuration of the non-contact power transmission device of FIG. 1 according to a modified example.

FIG. 2 illustrates a modified example of the non-contact power transmission device shown in FIG. 1. In this embodiment, a capacitor $C_8$ is further connected to the primary side coil $L_1$ of FIG. 1 in parallel.

A value obtained by adding capacitance of the capacitor $C_1$ and capacitance of the capacitor $C_8$ is set so as to be equal to the value of the capacitor $C_1$ in the non-contact power transmission device of FIG. 1.

According to this embodiment, drain currents of the field-effect transistors $Q_1$ and $Q_2$ can be lower than drain currents of the field-effect transistors $Q_1$ and $Q_2$ in FIG. 1 by adding the capacitor $C_8$, and the secondary side output voltage can be reduced by setting the values of the capacitors $C_1$ and $C_8$.

The function of the present invention will be explained with reference to a timing chart of FIG. 4.

Figure 4:
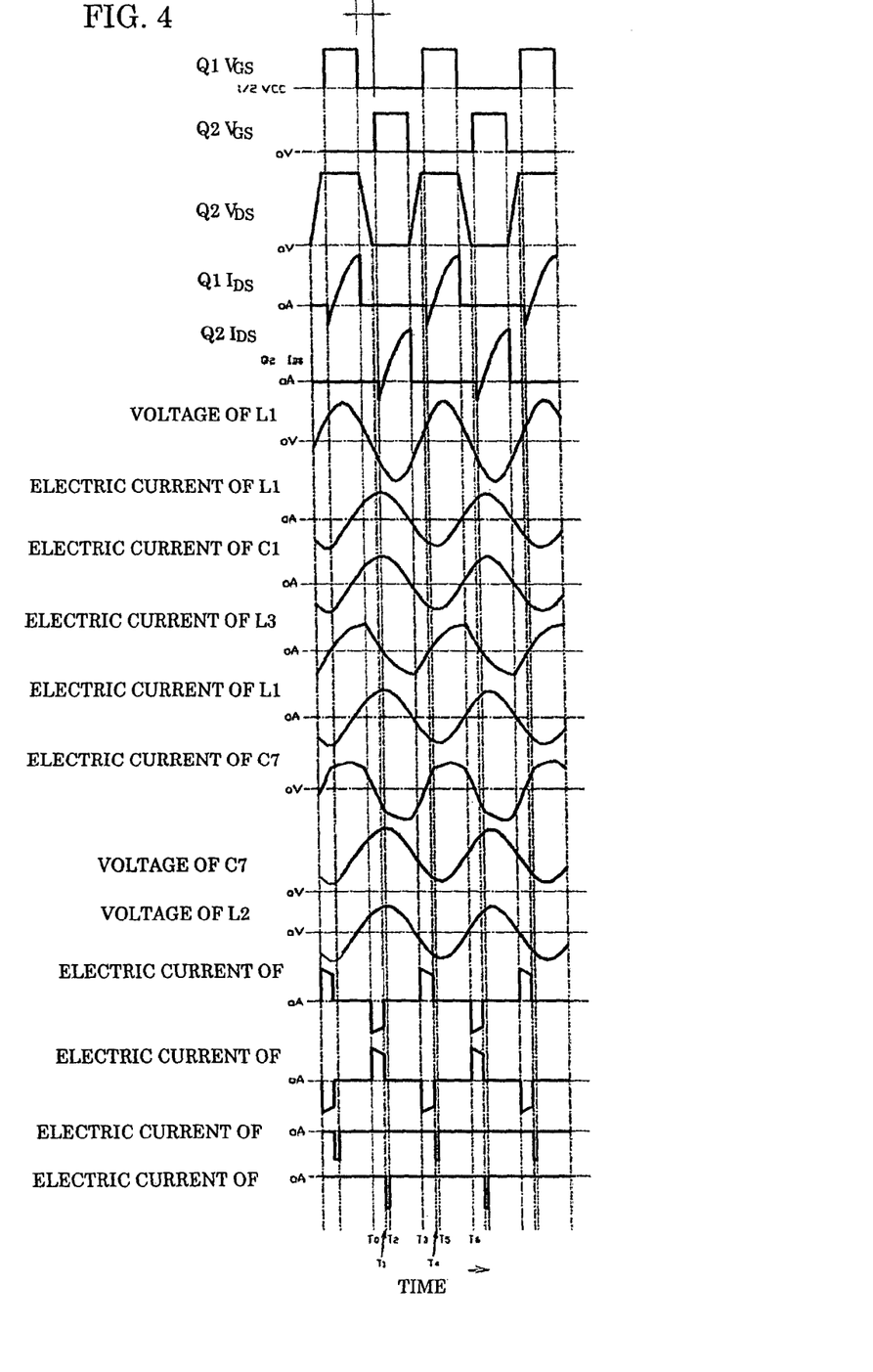
FIG. 4 is a time chart explaining a function of the non-contact power transmission device according to the embodiment.

In the timing chart of FIG. 4, a voltage for driving G-S of the field-effect transistor $Q_1$ is designated by $Q_1V_{GS}$, and a voltage for driving G-S of the field-effect transistor $Q_2$ is designated by $G_2V_{GS}$.

Similarly, in the timing chart of FIG. 4, dead time between the voltage $Q_1V_{GS}$ of the field-effect transistor $Q_1$ and the voltage $Q_2V_{GS}$ of the field-effect transistor $Q_2$ is designated by Dt.

In the circuit diagram of FIG. 1 or 2 and the timing chart of FIG. 4, the timing just before OFF of $Q_1$ is designated by $T_0$.

A gate voltage is applied between the gate and the source of $Q_1$ before $T_0$. This state is designated by $Q_1V_{GS}$ON. An electric current flows for a period $Q_1V_{DS}$ of $Q_1V_{GS}$ON, and the field-effect transistor $Q_1$ is ON state. This state is designated by $Q_1$ON.

A power supply voltage VCC is applied to the drain of $Q_2$ for the period of $Q_1$ON. For this period, the drain current $I_{DS}$ of $Q_1$ increases tentatively. The level of the electric current of $L_3$ is the same as the level of the drain current $I_{DS}$ of $Q_1$ at $T_0$.

When $Q_1$ is turned OFF at $T_0$, the electric current flowing in $L_3$ is branched into $C_3$ and $C_4$ due to self inductive effect of $L_3$ so as to flow, and $Q_2V_{DS}$ is tentatively reduced so that the voltage becomes 0 at $T_1$. When $Q_2$ is not turned ON at this time, the electric current flowing in the capacitors $C_3$ and $C_4$ transfer to $D_2$.

The electric currents of the capacitor $C_4$ and the drain $D_2$ flow from the source side to the drain side of the $Q_2$.

When $Q_2$ is turned ON at $T_2$, the electric current flowing in the drain $D_2$ transfers to $Q_2$. The electric current flows from the source side to the drain side of $Q_2$. The electric current of the coil $L_3$ reduces tentatively from $T_0$, and when the electric current of the primary side coil $L_1$ is lower than 0 A, the electric current of $Q_2$ flows from the source to the drain and increases as time passes. When $Q_2$ is turned OFF at $T_3$, $Q_2$ performs the same operation as that when $Q_1$ is turned OFF, and $Q_2V_{DS}$ increases so as to reach the VCC voltage. $Q_1$ and $Q_2$ repeat the ON and OFF operations alternately, so as to supply high-frequency currents to the L-shaped resonance circuit.

According to the present invention, on the secondary side, a voltage waveform of the sine wave which is similar to that of the primary side coil $L_1$ appears on the secondary side coil $L_2$, and the total efficiency of power transmission from the primary side to the secondary side can be 80% or more which is high efficiency. Further, the voltage and the electric current of the primary side coil $L_1$ of the coupling transformer form the sine wave with less distortion, and the unnecessary radiation of the harmonic component of the driving frequency to space can be reduced.

The preferred embodiment of the present invention has been explained, but the present invention is not limited to the above embodiment.

For example, the above explanation refers to the case where the series resonance circuit is provided to both the primary and secondary sides, but may be provided only to the primary side.

INDUSTRIAL APPLICABILITY

The non-contact power transmission device of the present invention can be applied to battery charging to be used for vehicles, robots and the other electrically-powered equipment, and power supply to these equipments.

The invention claimed is:

1. A non-contact power transmission device, comprising:
    a primary side unit including a primary side series resonance circuit having a primary side coil and a first capacitor resonating with the primary side coil, a driving circuit for the primary side series resonance circuit, and an L-shaped resonance circuit connected to the primary side series resonance circuit and the driving circuit and having a first coil and a second capacitor resonating with the first coil, and
    a secondary side unit formed separately from the primary side unit, said secondary side unit being arranged to be housed in the primary side unit to transfer power from the primary side unit to the secondary side unit and to be separated therefrom and including a secondary side series resonance circuit having a secondary side coil and a second capacitor resonating with the secondary side coil,
    wherein the first coil of the L-shaped resonance circuit has an inductance configured to adjust a current value flowing through the primary side coil, and the second capacitor has a capacity set such that a resonance frequency of the second capacitor with respect to the first coil is lower than a driving frequency of the driving circuit.

2. The non-contact power transmission device according to claim 1, wherein the L-shaped resonance circuit composes a filter.

3. The non-contact power transmission device according to claim 1, wherein a resonance frequency of the primary side series resonance circuit is adjusted to the driving frequency of the driving circuit.

4. The non-contact power transmission device according to claim 1, wherein a resonance frequency of the secondary side series resonance circuit is adjusted to the driving frequency of the driving circuit.

5. The non-contact power transmission device according to claim 1, wherein in the primary side series resonance circuit, a third capacitor is connected to the primary side coil in parallel.

6. The non-contact power transmission device according to claim 1, wherein the L-shaped resonance circuit composes an impedance matching circuit.

7. The non-contact power transmission device according to claim 1, wherein the second capacitor is connected parallel to the primary side series resonance circuit, and the first coil is arranged between the driving circuit and the primary side coil.

8. The non-contact power transmission device according to claim 2, wherein a resonance frequency of the L-shaped resonance circuit is made to be lower than the driving frequency of the driving circuit by 5% to 25%.

9. The non-contact power transmission device according to claim 7, wherein the driving circuit comprises an inverter and two phase oscillator for operating the inverter.

* * * * *